3,152,000
METHOD FOR TREATING TITANIUM DIOXIDE PIGMENTS TO OBTAIN HIGH GLOSS PROPERTIES
Franklin L. Kingsbury, New Brunswick, N.J., assignor to National Lead Company, New York, N.Y., a corporation of New Jersey
No Drawing. Filed Mar. 27, 1963, Ser. No. 268,456
7 Claims. (Cl. 106—300)

This invention relates in general to the manufacture of titanium dioxide pigments. More specifically it relates to a process for improving the properties of titanium dioxide pigments, particularly with respect to gloss.

Many well known methods are used for making titanium dioxide pigments in which titanium hydrate is produced by hydrolysis of a titanium sulfate solution followed by washing, bleaching and calcination to produce a calcined titanium dioxide pigment. This calcined material is then subjected to a wet milling operation wherein it is finely ground and dispersed, after which it is treated with a metal hydrous oxide and subsequently dried and milled to produce a finely divided pigment material possessing high hiding power or tinting strength.

One particular method for treating the calcined titanium dioxide pigment, which method has been used successfully on a commercial scale, is described as follows:

The calcined titanium dioxide pigment is subjected to a ball milling operation to reduce the agglomeration of the calcined material. In this ball milling operation a dispersing agent, such as an alkali metal phosphate or silicate, or other dispersants well known to the art, is employed. The ball milled discharge is then classified to remove the coarse particles and to the fine fraction is added one or more salts of aluminum, titanium, silicon, zirconium and mixtures thereof. These salts are then converted and precipitated as hydrous oxides by the addition of reagents to form such oxides. If desirable, a flocculating agent such as $MgSO_4$ may be added to the tank prior to, or after the addition of the metal salts. The coated titanium dioxide pigment is washed to remove any soluble salts. Upon drying and milling, the titanium dioxide pigment has high hiding power and good dispersion and develops a relatively high level of gloss in a paint enamel. Although titanium dioxide pigments in general have good gloss properties, it would be of great value to produce pigments having superior gloss values.

An object of this instant invention, therefore, is to prepare titanium dioxide pigments having superior gloss properties. A still further object is to produce titanium dioxide pigments having superior gloss properties by a process which is simple and economical to employ. These and other objects will become more apparent from the following more complete description of the instant invention.

Broadly, the instant invention contemplates a process for treating a titanium dioxide pigment to produce a pigment having improved gloss characteristics which comprises thoroughly mixing a dry or substantially dry titanium dioxide pigment with from 0.05% to 1.0% of a compound selected from the group consiting of perchloric acid and a salt of perchloric acid, calculated as perchloric acid said salt being selected from the group consisting of an alkali metal, alkaline earth metal, magnesium, zinc, hydrogen, ammonium, lead and silver perchlorate, the percentages being weight percentages based on the weight of the titanium dioxide being treated.

The process of the instant invention is simple to employ. The perchloric acid or the perchlorate salt is merely admixed in any manner with the substantially dry titanium dioxide pigment to obtain a uniform mixture. The perchloric acid or the perchlorate salt may be added either prior to during or after milling if desired. It is necessary that the pigment be dry or substantially dry since perchloric acid or perchlorate salts tend to disperse the pigment if water is present in sufficient amounts during the admixing step. Thus dispersion of the pigments tends to take place in the presence of the perchlorate salt when more than 10% of water is present in the titanium dioxide pigment.

It will be understood therefore that reference hereafter to a dry or substantially dry $TiO_2$ pigment is indicative of a pigment containing or having present not more than 10% water.

The amounts of the perchloric acid or the perchlorate salt used should lie within the range of 0.05% to 1.0% calculated as perchloric acid and based on the weight of the titanium dioxide being treated. Below 0.05% the improvement in the gloss properties is insufficient to warrant its use, while no advantage is found in using amounts above 1.0%.

Since the instant invention is primarily concerned with improving the gloss properties of the titanium dioxide pigment in non-aqueous media, the following test was used to obtain gloss values.

A standard baked enamel film of $TiO_2$ pigment, a binder of unreaformaldehyde and an alkyd vehicle was prepared as follows:

65 grams of the $TiO_2$ pigment were mixed with 35 grams of an alkyd vehicle. The mixture was passed through a three-roller mill to form a paste. 77 grams of the paste were then mixed with 48.7 grams of an alkyd vehicle, 25 grams of a urea-formaldehyde and 47.3 grams of xylol. This mixture was then rolled in a can for 30 minutes. After rolling, the mixture was allowed to stand for 30 minutes. Glass panels were dipped into the enamel, air dried and baked for 30 minutes at 150° C. Gloss values of the baked enamel panels were determined with a 20° gloss meter.

Similar baked enemal panels were then prepared using the $TiO_2$ pigment treated according to the instant invention. The gloss values of these baked enamel films were determined and compared with the gloss values of the standard film, the comparisons being expressed in percent increase in gloss values over the gloss value of the standard film.

In order to further illustrate the instant invention the following examples are presented.

EXAMPLE 1

A wet milled titanium dioxide pigment was used in this example. The pigment was dried to 95% solids. 0.3 gram of magnesium perchlorate was added to 10 ml. of water and the solution was added to the pigment prior to the final drying operation by trickling the solution onto 300 grams of pigment (dry basis) as the pigment was being fed to the drier. The amount of magnesium perchlorate added was equal to 0.09% perchloric acid based on the weight of the titanium dioxide pigment. After drying, the treated pigment was milled to produce a finely divided product. The gloss value of the treated pigment was determined in the manner herein above described and found to be 68. This gloss value was calculated to be 24% greater than the gloss value of the untreated pigment, run as a control, the gloss value of which was 55.

EXAMPLE 2

A pigment similar to that used in Example 1 was wet milled, washed and thoroughly dried. To 18 kg. of this dried pigment were added a water solution containing 18 grams of magnesium perchlorate and 2.50 ml. of water.

This solution was trickled onto the pigment as it was fed into a steam micronizer. The magnesium perchlorate added to the pigment was 0.09%, calculated as perchloric acid, based on the weight of the pigment.

After the milling operation the gloss value of the treated pigment was found to be 40% greater than the gloss value of the untreated control pigment.

EXAMPLE 3

In this example a dry pigment was treated, as in the preceding examples, except that the treating agent was added to the pigment after the pigment had been wet milled, dried and dry milled.

3.3 grams of magnesium perchlorate were dry blended with 300 grams of dry milled titanium dioxide pigment, equivalent to 1.0% perchloric acid on a $TiO_2$ basis.

The gloss value of the treated pigment was 22% greater than the gloss value of an untreated control pigment.

EXAMPLES 4–13

Using the procedure described in Example 1, a series of titanium dioxide pigment samples were treated with perchloric acid and a variety of perchlorate salts to produce treated pigments having superior gloss values. The operational details and the results obtained are recorded in the table below along with the results of Examples 1–3. In all cases the gloss values obtained are substantially improved over the untreated control pigments.

Table

| Example No. | Agent Used | Amount Used Calculated as Perchloric Acid ($TiO_2$ Wt. Basis), Percent | Percent Increase in gloss |
|---|---|---|---|
| 1 | Magnesium percholorate | 0.09 | 24 |
| 2 | do | 0.09 | 40 |
| 3 | do | 1.0 | 22 |
| 4 | Perchloric acid | 0.1 | 20 |
| 5 | Perchloric acid + sodium hydroxide to pH 7.5 | 0.1 | 33 |
| 6 | Barium perchlorate | 0.2 | 11 |
| 7 | Lead perchlorate | 0.2 | 9 |
| 8 | Silver perchlorate | 0.2 | 29 |
| 9 | Ammonium perchlorate | 0.2 | 14 |
| 10 | Potassium perchlorate | 0.2 | 7 |
| 11 | Zinc perchlorate | 0.2 | 11 |
| 12 | Lithium perchlorate | 0.2 | 16 |
| 13 | Sodium perchlorate | 0.1 | 48 |

From the above description of the invention and by the examples presented, it has clearly been shown that the gloss values of a titanium dioxide pigment may be improved when a dry or substantially dry pigment is treated with a small quantity of perchloric acid or a perchlorate salt.

The treating process of the instant invention is simple and economical to employ since the perchloric acid or the perchlorate treating agent is merely mixed with the pigment in any desired manner.

This application is a continuation-in-part of my application Serial Number 107,067, filed May 2, 1961, now abandoned.

While this invention has been described and illustrated by the examples shown, it is not intended to be strictly limited thereto, and other variations and modifications may be employed within the scope of the following claims.

I claim:

1. Method for treating titanium dioxide pigment containing water in amount of less than 10% which comprises thoroughly admixing said pigment and a compound selected from the group consisting of perchloric acid, and a salt of perchloric acid, said perchlorate salt being selected from the group consisting of an alkali metal, alkaline earth metal, magnesium, zinc, ammonium, lead and silver perchlorate, the amount of said compound employed, calculated as perchloric acid, being from 0.05% to 1.0% of the weight of said pigment, and drying said mixture.

2. Method according to claim 1 in which the compound added to the pigment is magnesium perchlorate.

3. Method according to claim 1 in which the compound added to the pigment is perchloric acid.

4. Method according to claim 1 in which the compound added to the pigment is sodium perchlorate.

5. Method according to claim 1 in which the compound added to the pigment is ammonium perchlorate.

6. Method according to claim 1 in which the compound added to the pigment is zinc perchlorate.

7. Method for treating dry titanium dioxide pigment which comprises thoroughly admixing said pigment and a compound selected from the group consisting of perchloric acid and a salt of perchloric acid, said perchlorate salt being selected from the group consisting of an alkali metal, alkaline earth metal, magnesium, zinc, ammonium, lead and silver perchlorate, the amount of said compound employed, calculated as perchloric acid, being from 0.05% to 1.0% of the weight of said pigment.

References Cited in the file of this patent

UNITED STATES PATENTS

| 2,220,966 | Krchma | Nov. 12, 1940 |
| 2,226,147 | Sutton | Dec. 24, 1940 |
| 2,232,168 | Dawson | Feb. 18, 1941 |
| 2,291,082 | Jarmus et al. | July 28, 1942 |